United States Patent [19]

Bauer et al.

[11] Patent Number: 5,582,430
[45] Date of Patent: Dec. 10, 1996

[54] SPRAY PROTECTION DEVICE FOR VEHICLES

[75] Inventors: Ulrich Bauer, Osterode-Lerbach; Jürgen Grahlmann, Hanover, both of Germany

[73] Assignee: Forbo-Poligras GmbH, Osterode/Harz, Germany

[21] Appl. No.: 185,796

[22] PCT Filed: Jul. 22, 1992

[86] PCT No.: PCT/EP92/01660

§ 371 Date: Jun. 6, 1994

§ 102(e) Date: Jun. 6, 1994

[87] PCT Pub. No.: WO93/01963

PCT Pub. Date: Feb. 4, 1993

[30] Foreign Application Priority Data

Jul. 22, 1991 [DE] Germany .......................... 41 24 260.2

[51] Int. Cl.⁶ .................................................. B62B 9/14
[52] U.S. Cl. ......................... 280/851; 280/847; 428/85; 428/97; 428/116; 428/253; 428/247; 428/256
[58] Field of Search ............................. 428/85, 97, 116, 428/284, 253, 256, 247; 139/410, 411, 412, 413, 415; 280/847, 851

[56] References Cited

U.S. PATENT DOCUMENTS

| | | | |
|---|---|---|---|
| 3,899,192 | 8/1975 | Reddaway | 280/154.5 |
| 4,391,870 | 7/1983 | Ellis | 438/218 |
| 4,598,000 | 7/1986 | Mantarro | 428/17 |
| 5,273,318 | 12/1993 | Naksyama | 280/851 |

FOREIGN PATENT DOCUMENTS

| | | |
|---|---|---|
| 0202059 | 11/1986 | European Pat. Off. . |
| 0243283 | 10/1987 | European Pat. Off. . |
| 0425852 | 5/1991 | European Pat. Off. . |
| 2618118 | 1/1989 | France . |
| 2132148 | 7/1984 | United Kingdom . |
| 2198696 | 6/1988 | United Kingdom . |

*Primary Examiner*—James J. Bell
*Attorney, Agent, or Firm*—Edward J. Timmer

[57] ABSTRACT

In order to improve a spray protection device for vehicles or vehicles trailers for reducing the spray occurring behind a travelling vehicle and produced by the wheels running on wet roads, the spray protection device having the form of a flat structure with a first side facing the relevant vehicle wheel and a second side facing away from this wheel, whereby the first side is formed by an inlet layer having water passage openings, at the back of this inlet layer facing away from the first side at least one spacer is provided for creating a void between the inlet layer and a carrier for the spacer and the inlet layer, such that it is economically produceable and can be fitted to any type of vehicle, it is proposed that the spray protection device be designed such that its inlet layer is formed from a textile material web flexible in any direction.

37 Claims, 4 Drawing Sheets

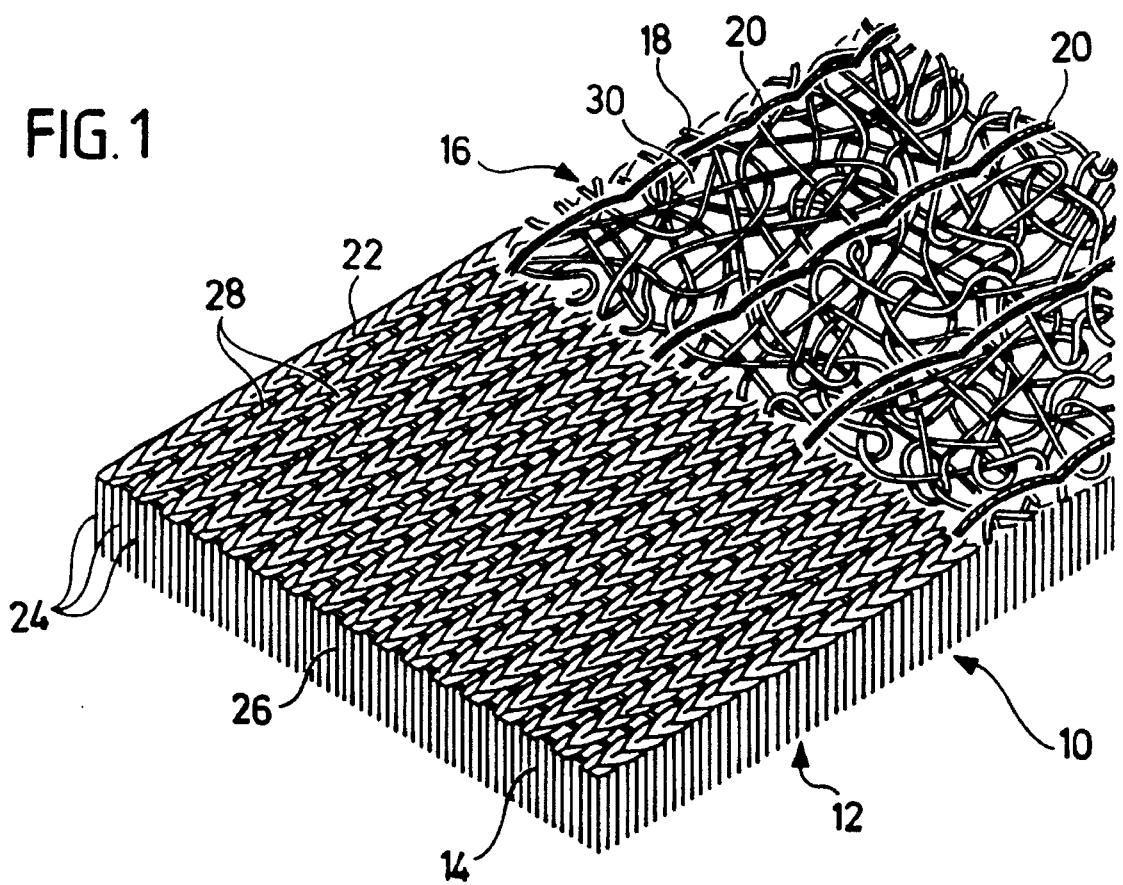
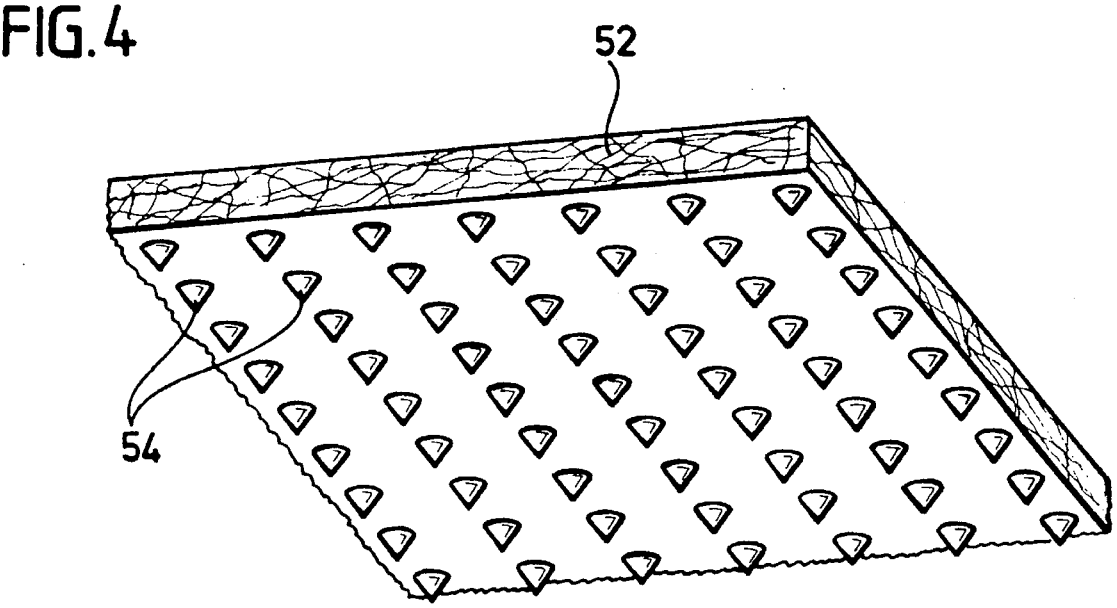

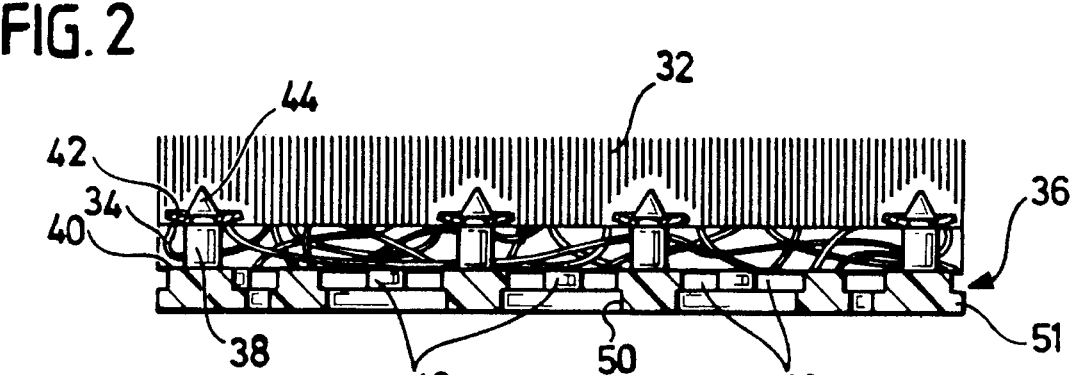
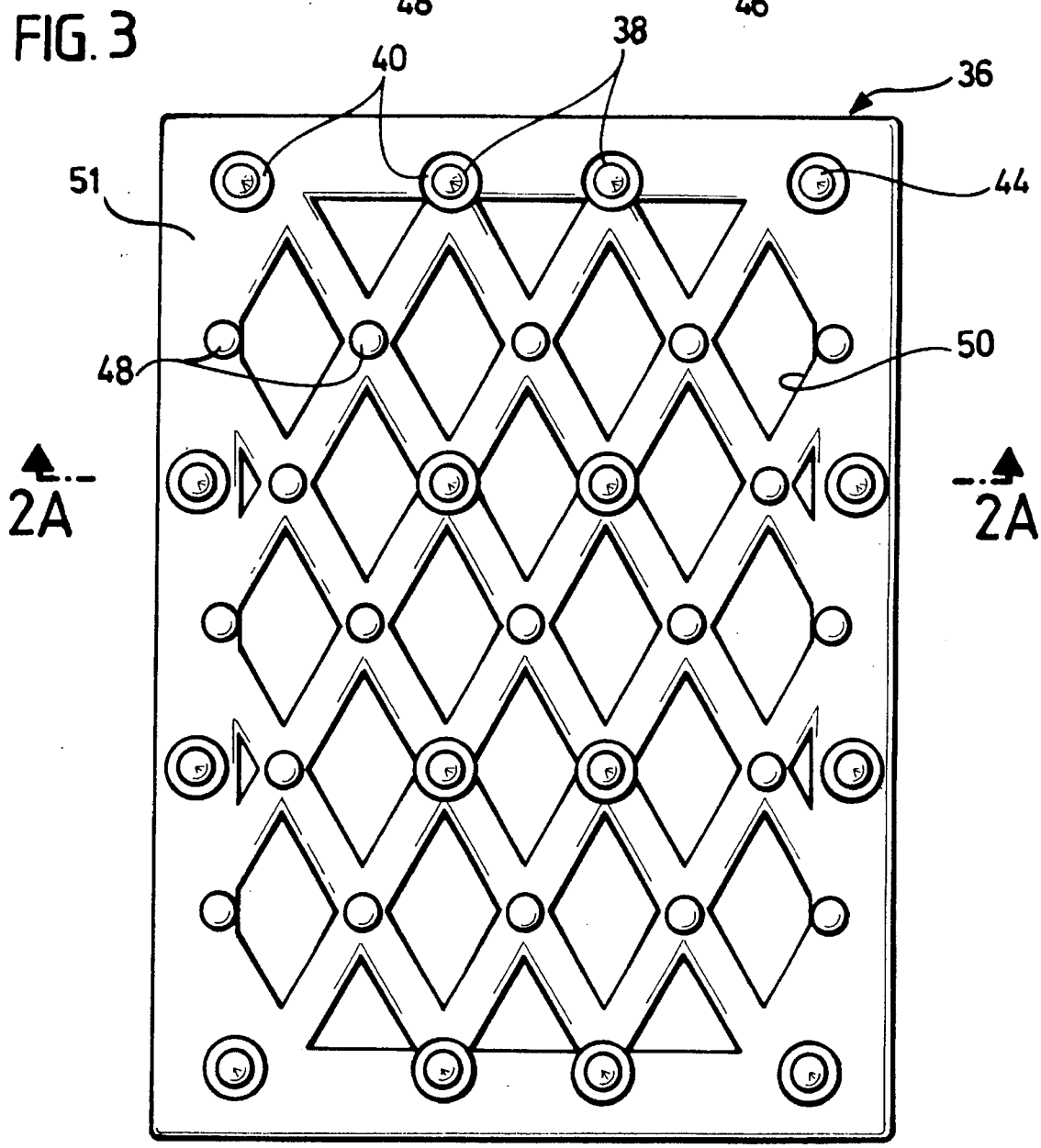

SPRAY PROTECTION DEVICE FOR VEHICLES

This application is a 371 of PCT/EP42/01668 Jul. 22, 1992.

The invention relates to a spray protection device for vehicles or vehicle trailers for reducing the spray occurring behind a travelling vehicle and produced by the wheels running on wet roads, said spray protection device having the form of a flat structure with a first side facing the relevant vehicle wheel and a second side facing away from this wheel, whereby the first side is formed by an inlet layer having water passage openings, at the back of the inlet layer facing away from the first side at least one spacer is provided for creating a void between the inlet layer and a carrier for the spacer and the inlet layer.

In particular, the invention relates to a water absorber according to the Guideline 91/226/EEC of the Council of the European Communities of Mar. 27, 1991.

Such a spray protection device can be part of the wheel cover and/or the splash guard and/or the skirt joined laterally to the wheel cover, but it is also possible to attach such a spray protection device to the wheel cover and/or the splash guard and/or the skirt. Usually, the wheel cover is to be understood as a mudguard, the splash guard or mud flap as a component attached behind the relevant wheel on the lower part of the chassis or a loading area or on the wheel cover, this component extending in the direction towards the road surface.

When it was ascertained at the beginning that a spray protection device of the generic type has the form of a flat structure, then it is herewith to be understood that the measurements of the surface of the spray protection device are large in comparison to its thickness.

Two known spray protection devices of this type are to be briefly described in the following. A first known spray protection device (EP-A-0 425 852) comprises a rigid, plate-shaped, back component having in the cross-section, L-shaped, vertical side areas extending to the front in the direction towards the vehicle wheel—the back component, thus, has in the cross-section, a U-shaped design with inwardly angled flanks—as well as a rigid, front component forming the inlet layer, which is held by the L-shaped side areas of the back component, whereby a void is created between front and back components. The front component is formed by two or several strips or struts which are, in particular, triangular-shaped in the cross-section and extend in vertical direction and by strips or struts which are, in particular, designed in the same way as the first, joined with these and extend in horizontal direction. Ribs are integrally formed on the back component for drainage purposes, as well as numerous pin-like projections, which, like the ribs, extend into the void and which serve to absorb the kinetic energy of the water penetrating through the front component into the spray protection device. The cited publication deals with the dimensioning and the arrangement of the projections and the ribs on the back component, i.e. with the problem of draining the water which has reached the void, as well as the construction of the front component formed by crosspieces and with the problem of attaching this front component to the back component.

A spray protection device of the type described in the beginning known from GB-2 132 148 A comprises an inlet layer which is designed in accordance with the front component of the precedingly described spray protection device, as well as an energy absorbing layer and a spacer layer. The energy absorbing layer is formed by two sets of parallel extending, elongated elements which cross each other at a certain angle, and the spacer layer is formed by an integrally extruded diamond-shaped mesh, which either keeps the inlet layer and the energy absorbing layer at a distance from each other or keeps the last-mentioned layers at a distance from a back component, as for example, a spray flap which, for its part, holds the spray protection device.

At least in the known spray protection device dealt with first, this is a finished component, which has the disadvantage that due to the variety of types of vehicles, an exceptionally large number of the most varied spray protection devices need to be manufactured and kept in stock. Inasfar as the second known spray protection device is designed to be so flexible at all that a mudguard, for example, with a relatively small radius of curvature can be fitted therewith, then the assembly of the various layers proves to be costly and difficult, since their inherent elasticity or inherent rigidity acts against the adaptation to the curvature of the mudguard. Particularly due to the filigrain structure of the inlet layer, this spray protection device is, as is also the device firstly discussed, susceptible to damage by stones being thrown up against the spray protection device. Also, the edge areas of the inlet layer which are formed by end portions of the parallel crosspieces represent weak points of this known spray protection device.

Both known spray protection devices are so complicated and costly in their construction that an inexpensive production, in particular for various types of vehicles, is not realizable.

The invention was based on the object of specifying a spray protection device of the type in question, in which the previously described problems of known spray protection devices do not occur and which are manufacturable under warrantable costs.

Proceeding on the basis of a spray protection device of the type mentioned at the outset, this object can be solved according to the invention in that the inlet layer is formed from a textile material web flexible in any direction.

A textile material web is to be understood as a web of any woven fabric, weft-knitted fabric, knitted fabric or fleece (also needle fleece) of any desired textile material, of metal wire or of plastics material.

The characteristic "flexible in any direction", is to be understood such that-the textile material web forming the inlet layer is deflectable in relation to every straight line in the plane of the web; i.e. it can, in particular, be essentially adapted without resistance to any desired surface structure.

Since the carrier concerns a part which is separated from the actual spray protection device, e.g. the wheel cover (mudguard) or the splash guard, the spray protection device designed according to the invention is freely manufacturable and is adaptable to any desired type of vehicle, whereby the spacer to be described at a later point ought not to essentially impair the flexibility of the textile material web. In this case, the second side of the spray protection device is formed by the back of the material web and/or the spacer.

Inasfar as the embodiments of the spray protection device according to the invention are concerned, in which the carrier is part of the spray protection device, for example in particular, a water-impermeable, flat plastics material, it is recommended to design the carrier at least to be so sufficiently flexible that it can be adapted without problem to that vehicle part onto which it is to be mounted. Also, in the latter case, it has proven to be advantageous to choose or design the carrier such that the spray protection device is freely manufacturable.

The effectiveness of a spray protection device according to the invention is further increased when the material web has elongated projections protruding to the front. Hereby, energy is withdrawn from the water thrown against the spray protection device and reflection producing spray is almost completely eliminated. However, U.S. Pat. No. 3,899,192 and U.S. Pat. No. 4,598,000 disclose a laminated spray protection device of a different generic type which comprises a three-dimensional thermo-plastic layer provided with elongated projections, this layer being placed on a water-impermeable back layer and fixed thereon. Since there is not the slightest indication in the afore-mentioned patent publications of a void between a carrier and an inlet layer or of the front plastics layer being water-permeable and, besides, since the non-textile, three-dimensional front layer with the projections, particularly when it is applied to the carrier layer, is water-impermeable and would, therefore, not be usable as inlet layer of the device according to the invention, then the two citations could not have anticipated the inventive design of the material web with projections.

The elongated projections can consist of any desired material, in particular, of a thermoplastic plastics mass injection-molded or applied in any other manner to the material web; projections formed by wire bristles are also conceivable. Projections consisting of textile materials, as for example plastic fibers and/or plastic ribbons are, however, preferred.

In order to guarantee an absorption, which is as effective as possible, of the particularly heavily soiled liquid medium thrown up against the spray protection device, a pile fabric is preferred as material web provided with projections. The pile fabric can, in this case, be a tufted fabric in which the U-shaped tufts forming the pile are held in a knitted fabric, woven fabric or fleece as carrier layer. The pile can also be anchored in the actual material web by a textile bonding; in this case, the material web is formed, in particular, by a base fabric with loops raised out of the plane of the knitted fabric, which loops can be cut off or unravelled to form projections having a free end parallel to the plane of the base fabric. It has proven to be particularly advantageous to form the material web including pile from a Raschel fabric. In order to form a pile fabric, a Raschel fabric manufactured as double-layered Raschel fabric need merely be unravelled between its two flat material webs in the manner known per se. On condition of adequate water-permeability of the Raschel fabric, this can, also in the non-separated state, serve as inlet layer of the spray protection device according to the invention. Should the threads or wires connecting the two flat material webs of a double-layered Raschel fabric be adequately stiff, then these can even form the spacers and the one flat material web can form the carrier.

As results from the preceding statements, the material web forming the inlet layer can preferably be an artificial turf web known per se which, however, must have an adequate water-permeability for this.

For the construction of the spacer or spacers, it is of particular significance that the amount of water which has passed through the material web can be drained with adequate speed within the void created by the spacer or spacers. With particular reference to this, it has proven to be expedient for the material web to have projections protruding to the back and forming spacers, e.g. in the form of spacer pins or rivets and the like, which are attached to the material web. However, projections integrally formed on the back of the material web are also conceivable, which can be injection-molded onto or applied to the back of the material web by means of suitable devices, for example rollers provided with recesses, in the form of a hardened mass.

Preferred embodiments of the spray protection device according to the invention have a sandwich construction, especially when the carrier is part of the spray protection device or after the latter has been attached to a carrier belonging to the relevant vehicle, for example to the mudguard or the splash guard. In the first case, the spray protection device is preferably designed such that it has a second material web forming the carrier and which, like the first material web forming the inlet layer, is flexibly designed and is connected therewith such that the two material webs and the spacer form a flat, flexible sandwich structure. Such a spray protection device is adaptable to any desired form of an inner side of a mudguard due to its flexibility; furthermore, it can be manufactured very economically, for example, from a sandwich web sold by the meter, in that the individual sandwich layers of the spray protection device can be cut to the desired measurement by a single cutting process and no separate manufacturing process is necessary for each individual layer. With this, the problem often occurring in separate manufacture of inlet layer, spacer material and carrier, namely that the resulting measurements differ from each other and time-consuming reworkings have to be undertaken, is reliably prevented.

The connection of the various elements of the spray protection device or, in particular, the sandwich construction (inlet layer, spacer material and carrier) can, as a function of the materials used, take place by means of all known jointing processes, such as welding, glueing, connecting by means of mechanical connecting elements, sewing or the like, as well as with or without additional auxilliary materials.

A particularly economically manufacturable embodiment of the spray protection device according to the invention with sandwich construction is represented by a double-layered weft-knitted fabric; this is to be understood as two flat material webs which are connected with each other by threads, yarns, wires or ribbons which are tied into the webs; the threads, yarns, wires or ribbons preferably made of plastics material have such an inherent stiffness for the application in question that a void is formed between the two flat material webs in which the water penetrating through the flat material web serving as inlet layer can be drained off. A spray protection device developed in this manner is distinguished by good water absorption, high flexibility and good long-term behaviour, in particular when weather-resistant plastic materials are used. By means of the structured surface of the weft-knitted first material web, the kinetic energy of the water striking this web is absorbed. The water penetrating through the first material web can flow downwards between the connecting crosspieces formed by the stiff threads, yarns, etc. and/or drain towards the sides.

As already mentioned above, spacer bolts or rivets or the like are usable as spacers in the precedingly described spray protection devices according to the invention; the spacer can also, however, be formed by a flexible layer provided with openings, whereby the openings are in communication with each other so that the water penetrating through the first material web is drainable through the layer and/or in the layer. The advantages of such a spacer layer are to be seen particularly in the fact that the first material web is held and supported at a distance from the carrier over its entire surface, and not only punctually, as for example in the case of the spacer bolts. When the first material web and the spacer layer are not connected with each other only punctually, the danger of the first material web detaching in places and this detachment spreading, is effectively avoided.

The term "opening" in the spacer layer is not to be understood such that a channel connecting both sides of the spacer layer has to be present, and should such a channel-shaped opening be present, then it must not necessarily form a passage opening in a plan view of the spacer layer, but rather it is merely to be emphasized that voids merging into each other are provided in the spacer layer, which at least partially border the first material web and must at least be designed of such a size that they are not blocked by impurities which have passed through the first material web and that the water penetrating the first material web is drainable through the voids.

In an especially favourable embodiment of the spray protection device, the spacer layer is made of an irregular wire structure as can be acquired from the company AKZO. Such an irregular or random wire structure is a layer of wires irregularly crossing over and under each other, which are connected with each other and can be of metal or plastics. Such a layer is distinguished by high water-permeability and good flexibility and is almost insensitive to every kind of mechanical interference. Likewise, the ideal purification behaviour of such an irregular wire structure is to be emphasized.

In a further embodiment of the spray protection device according to the invention, the spacer layer comprises a first layer in the form of an essentially plane wire mesh and a second layer in the form of a second wire mesh forming a three-dimensional hilly structure. The first layer of the spacer layer preferably abuts on the first material web and the second layer abuts on the carrier, whereby an areal connection with the first layer is possible and, simultaneously, the advantages of a hilly structure can be utilized, namely an even better flexibility and adaptability to the respective mudguard shape, as well as the almost definite elimination of blockages within the spacer layer on account of the large voids between the first material web and the carrier created by the hilly structure.

The two layers can be connected in any desired manner, in particular, by seams; for reasons of durability, however, it is recommended to weld the two layers together.

In order to create a particularly stable spray protection device, for example, as is desirable for vehicles which are exposed to extreme mechanical loads by heavy dirt or mud, as for example, construction site vehicles, it has been shown that when at least one of the two layers is formed by two wire meshings abutting on each other, an essential increase in stability is achieved.

A good surface stability as well as an excellent long-term behaviour while retaining the flexibility as well as a very high water absorption capacity are achieved with a spray protection device, the spacer layer of which is formed by a particularly impregnated and weft-knitted or woven material web which is shaped in accordance with a three-dimensional hilly structure and has approximately the surface structure of half a commercial egg carton (reduced, if necessary). The previously described spacer layer can be connected at its elevations or in the area of its valleys with the material web forming the inlet layer, whereby in the first case, the water penetrating the first material web and possibly containing solid dirt particles, can drain between the first material web and the plastics web, i.e. between the hills, without having to pass through the plastics web.

When a spray protection device according to the invention has a sandwich construction with a carrier belonging to the spray protection device, then it has proven to be particularly favourable in view of the stability when the second material web forming the carrier is a flexible plastics sheet which is attachable to the mudguard of a vehicle by means of suitable attachment elements, as for example screws, bolts, pins with resilient securing elements or the like.

In the preceding embodiment of the spray protection device according to the invention, it is possible to attach the spacer or spacers to the carrier instead of to the material web, which proves to be particularly advantageous, in particular, when the material web is damaged, since in this case this material web can be detached and replaced by a new material web without the spacers, which are arranged relatively protected and thus, by far, less endangered, having to be replaced as well.

Also in this case, it has proven to be expedient when the carrier has projections protruding to the front and forming spacers, these projections can be integrally formed on, in particular, injection-molded onto the front side of the carrier as is done on the back of the first material web.

In a further development of the invention, the embodiment in question of the spray protection device can, however, be improved such that at least some of the projections serve simultaneously as attachment elements for the material web forming the inlet layer. This portion of the projections is then preferably designed like a pin and longer than the remaining projections merely forming spacers and can be pushed through the first material web; in order to simultaneously undertake the function of a spacer, this portion of the projections preferably has a stop for the material web forming the inlet layer.

It has been shown that for the required spray absorption, it is adequate when the spacer—measured in the direction vertically to the material web forming the first side—has a height of at least 5 mm, preferably a height of at least 6 mm, and the embodiments preferred are those in which the spacer has a height of approximately 8 mm. As suitable upper limit for the height of the spacer, approximately 20 mm are suggested, since an even greater measurement would no longer lead to an appreciable improvement of the spray absorption, but would result in difficulties when fitting the spray protection device.

For the desired water-permeability of the material web forming the first side, it is sufficient when this material web has an open passage area of approximately 5% to approximately 8%, the open passage area should total at least approximately 5% (the sum of the areas of the water passage openings should, therefore, amount to at least approximately 5% of the total area of the material web).

Further features, advantages and details of the invention result from the following description as well as the illustrated representation of several particularly preferred embodiments of the spray protection device according to the invention; in the drawings:

FIG. 1 is a view of a first embodiment of the spray protection device according to the invention having a pile fabric and an only partially represented spacer layer;

FIG. 2 is a sectional view of a second embodiment of the spray protection device according to the invention with a carrier;

FIG. 3 is a plan view onto the carrier of the spray protection device according to FIG. 2;

FIG. 4 is a view of a further embodiment of the spray protection device according to the invention with a fleece and a multiplicity of spacers;

Figure 5:
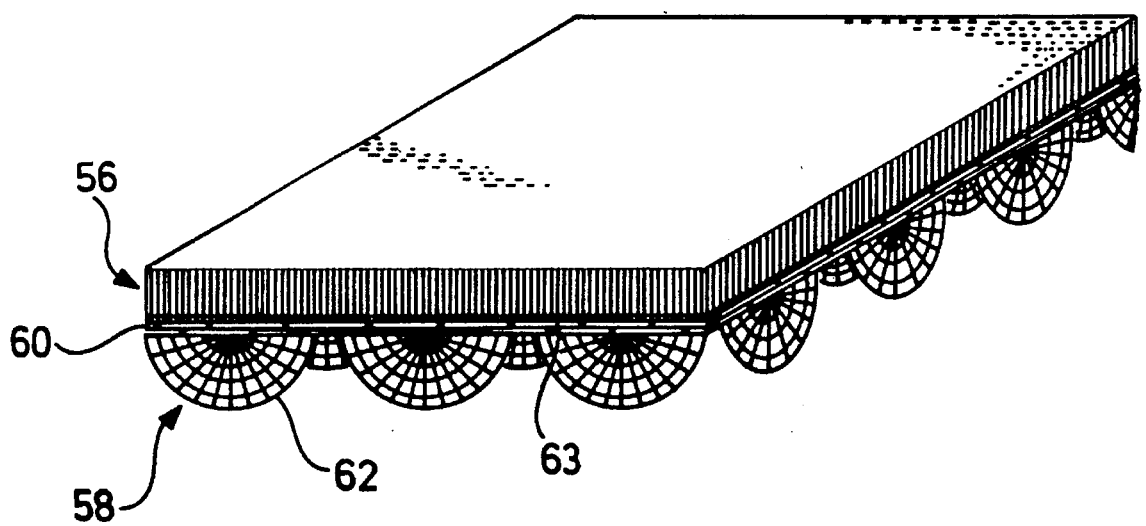
FIG. 5 is a view of a fourth embodiment of the spray protection device according to the invention with a pile fabric and a spacer layer consisting of several meshes.

The first embodiment of the spray protection device according to the invention illustrated in FIG. 1 comprises an inlet layer 14 formed from a pile fabric 10 and representing a first side 12 of the spray protection device as well as a spacer layer 16 in the shape of an irregular wire structure 18, which is attached to the side 22 of the pile fabric 10 facing away from the first side 12 by means of parallel seams 20.

In the assembled state, the spacer layer 16 abuts, for example, against the side of a mudguard facing the vehicle wheel and is attached with any desired attachment means. Coarse components such as small stones, leaves, branch pieces and the like which are thrown up by the vehicle wheels against the inlet layer 14 of the spray protection device or are carried along by the water thrown against this, are retained by the pile fabric 10 and either fall back onto the road or are caught in the pile 26 formed by plastic ribbons 24 in the inlet layer 14 and can be removed during the normal car wash with a jet of water. Smaller floating components in the impinging water are flushed through the water passage openings 28 in the pile fabric 10, if necessary, and flow out with the water within the void 30 formed by the irregular wire structure 18 between mudguard and pile fabric 10.

An embodiment of the spray protection device according to the invention represented in FIG. 2 comprises, on the other hand, an artificial turf web 32, which is attached to a layer of an irregular wire structure 34, as well as a plate-like carrier 36 with pin-like projections 38 protruding to the front, which extend through the irregular wire structure 34 and through the artificial turf web 32 and hold these thereby. The projections 38 have, however, at a distance from the carrier 36, a stop 40 against which the side of the irregular wire structure 34 facing the carrier abuts; by means of securing elements 42 which are placed onto the ends 44 of the projections 38 extending through the irregular wire structure 34 and the artificial turf web 32, the double-layered inlet layer formed by irregular wire structure 34 and artificial turf web 32 is held in this position, whereby a void 46 is formed between the side of the irregular wire structure facing the carrier 36 and the carrier 36.

In addition to projections 38 serving as spacers as well as attachment elements, further projections 48 are provided which only have a function as spacer and against which the irregular wire structure abuts. In another variation not illustrated, the projections have a cone-shaped design so that the apex of the cone penetrates the inlet layer and the projections are, therefore, not exclusively attributed with a function as spacer, but they also aid in positioning the inlet layer in relation to the carrier 36. Instead of the double-layered inlet layer formed by the artificial turf web 32 and the irregular wire structure 34, an inlet layer only formed from a single, flexible material web could also be used.

The plan view onto the plate-shaped carrier 36 of the preceding embodiment illustrated in FIG. 3 displays the arrangement of the projections 38 and 48 as well as diamond-shaped openings 50 in the plastics sheet 51 forming the carrier 36, which give this sheet an increased pliability and make it possible to clean the void 46 by means of a jet of water or the like when the spray protection device is removed from the vehicle.

The embodiment of the spray protection device according to the invention represented in FIG. 4 consists of a fleece 52 forming the inlet layer of the spray protection device and the side of the fleece facing away from the vehicle wheels has essentially cone-shaped projections 54 integrally formed thereon and forming spacers. This embodiment is particularly economical to manufacture and due to its good flexibility, is adaptable to every mudguard shape without demanding costly manufacturing operations. Due to the structured surface of the fleece, the kinetic energy of the impinging water is absorbed, the solid components are filtered and by means of the water which has penetrated through the fleece 52, can drain off in the void formed by the projections 54 between the fleece 52 and a carrier or mudguard not illustrated.

A particularly robust and still very flexible embodiment of the spray protection device is represented in FIG. 5, it has, on the other hand, a weft-knitted, water-permeable pile fabric 56 as inlet layer and a spacer layer 58 consisting of two double layers 60 and 62 of a plastics mesh, whereby the first layer 60 is formed from two essentially plane wire meshes abutting on each other and the second layer 62 consisting of two wire meshes likewise abutting on each other which are, however, shaped according to a three-dimensional hilly structure. The two layers 60 and 62 are welded to each other and to the back 63 of the weft-knitted pile fabric 56.

Figure 6:
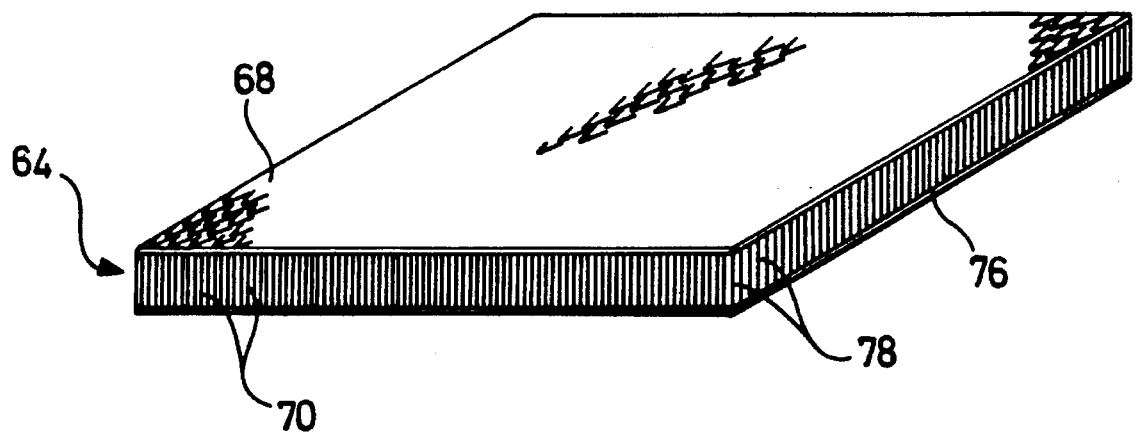
FIG. 6 is a view of a fifth embodiment of the spray protection device according to the invention consisting of a double-layered weft-knitted fabric.

A spray protection device consisting of a Raschel fabric 64 is represented in FIG. 6; its weft-knitted and water-permeable top web 68 which forms the inlet layer of the spray protection device, is distanced by adequately rigid and spacer-forming connecting crosspieces 70 from its similarly weft-knitted bottom web 76 forming the second side or a carrier layer of the spray protection device, by means of which a void 78 is created.

Figure 7:
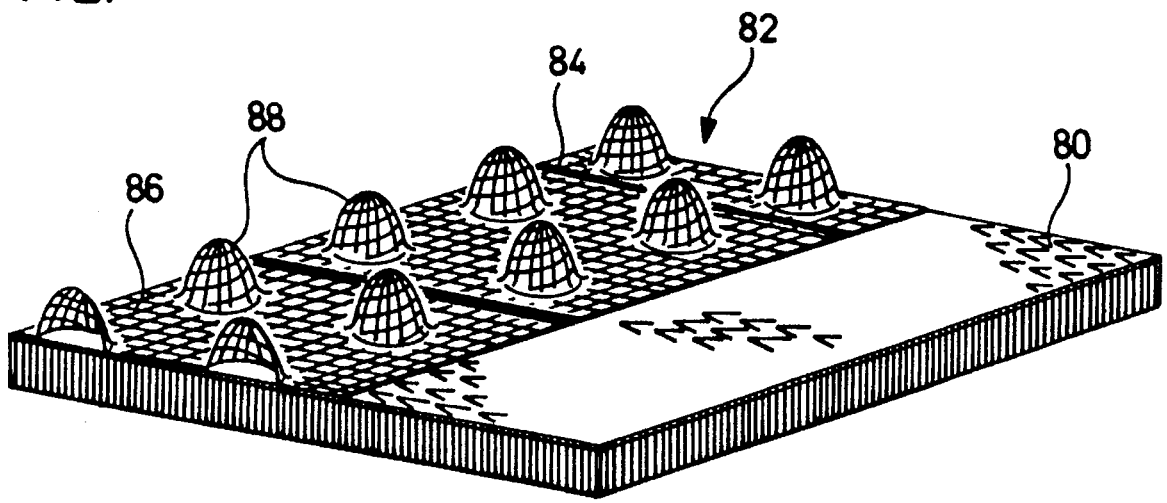
FIG. 7 is a view of a sixth embodiment of the spray protection device according to the invention with a pile fabric and a spacer layer shaped from a plastics weft-knitted fabric and only partially represented and FIG. 8 is a last embodiment of the spray protection device according to the invention with a fleece and spacer layer shaped from a plastics weft-knitted fabric.

The embodiment of the spray protection device according to the invention represented in FIG. 7 comprises, on the other hand, a water-permeable, weft-knitted pile fabric 80 as inlet layer in the form of an artificial turf web, the side of which, facing way from the visible side, is attached to an impregnated, weft-knitted material web 82 having water passage openings by means of seams 84, the latter web having been previously shaped such that hills 88 rising from the plane 86 of the material web 82 are formed which serve as spacers of the spray protection device.

Figure 8:
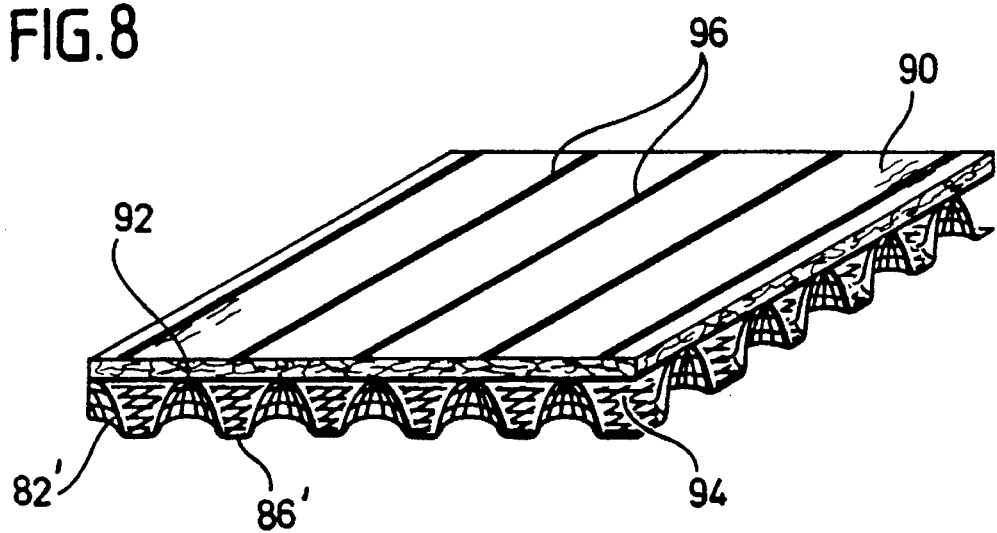

The spray protection device represented in FIG. 8 comprises a fleece 90 as inlet layer and its spacer layer is formed from the same, water-permeable, weft-knitted material web 82' as the spacer layer in the embodiment according to FIG. 7; as opposed to this, the material web 82', however, with its elevations 92, abuts on the side of the fleece 90 facing away from the vehicle wheels in the assembled state of the spray protection device, so that a void 94 is created between the plane 86' of the plastics web 82' and the fleece 90. The plastics web 82' and the fleece 90 are connected with each other by seams 96.

We claim:

1. Vehicle spray protection device for reducing spray occurring behind a travelling vehicle and produced by a vehicle wheel running on a wet road, said device having a relatively thin sheet structure with a first side for facing a vehicle wheel and a second side facing away from said first side, said vehicle spray protection device comprising:

a water permeable inlet layer having a front side forming said first side, a backside, and water passage openings between said front side and said backside, said inlet layer comprising a textile material web which is flexible in any direction and being conformable to a curved surface, said textile material web comprising a textile material selected from the group consisting of woven fabrics, weft-knitted fabrics, knitted fabrics and fleeces, said textile material being effective as a dirt filter and water droplet retarding means, and at least one spacer disposed on the backside of said inlet layer and conformable to the curved surface, said spacer means providing a plurality of voids in communication with one another between said inlet layer and a carrier used for mounting said inlet layer and said spacer in operative position in relation to a vehicle wheel.

2. Vehicle spray protection device according to claim 1, characterized in that the textile material web has elongated projections protruding to the front.

3. Vehicle spray protection device according to claim 2, characterized in that the elongated projections are plastic ribbons.

4. Vehicle spray protection device according to claim 2, characterized in that the textile material web is a pile fabric.

5. Vehicle spray protection device according to claim 4, characterized in that the pile fabric is a tufted fabric.

6. Vehicle spray protection device according to claim 4, characterized in that the pile is anchored in the textile material web by a textile binding.

7. Vehicle spray protection device according to claim 4, characterized in that the pile fabric is a Raschel fabric.

8. Vehicle spray protection device according to claim 1, characterized in that the spacer is attached to the textile material web.

9. Vehicle spray protection device according to claim 8, characterized in that the textile material web has projections protruding to the back and forming the spacer.

10. Vehicle spray protection device according to claim 9, characterized in that the projections are integrally formed on the back of the textile material web.

11. Vehicle spray protection device according to claim 1, characterized as having a second textile material web forming the carrier, said second textile material web being designed so as to be as flexible as the first textile material web forming the inlet layer and being attached to this first textile material web such that the two textile material webs and the spacer form a flexible sandwich structure.

12. Vehicle spray protection device according to claim 11, characterized as having a double-layered weft-knitted fabric.

13. Vehicle Spray protection device according to claim 1, characterized in that the spacer is formed from a flexible layer provided with openings, and that the openings are in communication with each other such that the water penetrating through the first textile material web is drainable through the layer and/or in the layer.

14. Vehicle Spray protection device according to claim 13, characterized in that the spacer layer is formed from an irregular wire structure.

15. Vehicle spray protection device according to claim 13, characterized in that the spacer layer comprises a first layer in the form of an essentially plane wire mesh and a second layer in the form of a second wire mesh forming a three-dimensional hilly structure.

16. Vehicle spray protection device according to claim 15, characterized in that the first and second layers are welded together.

17. Vehicle Spray protection device according to claim 15, characterized in that at least one of the first and second layers is formed by two wire meshes abutting each other.

18. Vehicle spray protection device according to claim 13, characterized in that the spacer layer is formed from a plastics web shaped in accordance with a three-dimensional hilly structure.

19. Vehicle spray protection device according to claim 18, characterized in that the plastics web is connected at its elevations with the textile material web forming the inlet layer of the spray protection device.

20. Vehicle spray protection device according to claim 18, characterized in that the plastics web is connected in the region of its valleys with the textile material web.

21. Vehicle spray protection device according to claim 1, characterized in that the textile material web and the spacer are mechanically connected with each other.

22. Vehicle spray protection device according to claim 21, characterized in that the textile material web and the spacer are connected with each other by seams.

23. Vehicle spray protection device according to claim 1, characterized in that the textile material web and the spacer are welded to each other.

24. Vehicle spray protection device according to claim 1, characterized as further including a second textile material web which is a flexible plastics sheet.

25. Vehicle spray protection device according to claim 1, characterized as further including the carrier and the spacer is attached to the carrier.

26. Vehicle spray protection device according to claim 25, characterized in that the carrier has projections protruding to the front and forming spacers.

27. Vehicle spray protection device according to claim 25, characterized in that the projections are injection-molded to the carrier.

28. Vehicle spray protection device according to claim 26, characterized in that at least a portion of the projections comprise attachment elements for the textile material web forming the inlet layer.

29. Vehicle spray protection device according to claim 1, characterized in that the spacer as measured in a direction vertically to the textile material web forming the first side has a height of at least 5 mm.

30. Vehicle spray protection device according to claim 29, characterized in that the spacer has a height of at least 6 mm.

31. Vehicle spray protection device according to claim 30, characterized in that the spacer has a height of 6–8 mm.

32. Vehicle spray protection device according to claim 30, characterized in that the spacer has a height of 20 mm at the most.

33. Vehicle spray protection device according to claim 1, characterized in that the textile material web forming the front side has an open passage area of at least 5%.

34. Vehicle spray protection device according to claim 3, characterized in that the textile material web is a pile fabric.

35. Vehicle spray protection device according to claim 14, characterized in that the spacer layer comprises a first layer in the form of an essentially plane wire mesh and a second layer in the form of a second wire mesh forming a three-dimensional hilly structure.

36. Vehicle spray protection device according to claim 16, characterized in that at least one of the first and second layers is formed by two wire meshes abutting each other.

37. Vehicle spray protection device according to claim 27, characterized in that at least a portion of the projections comprise attachment elements for the textile material web forming the inlet layer.

* * * * *